(12) United States Patent
Yoo et al.

(10) Patent No.: US 11,649,338 B2
(45) Date of Patent: May 16, 2023

(54) COMPOSITE, ARTICLE, BATTERY CASE, AND BATTERY

(71) Applicant: SAMSUNG ELECTRONICS CO., LTD., Suwon-si (KR)

(72) Inventors: Joungeun Yoo, Seongnam-si (KR); Eun Sung Lee, Hwaseong-si (KR); Sung Dug Kim, Suwon-si (KR); Hyoungwoo Choi, Hwaseong-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 571 days.

(21) Appl. No.: 16/726,544

(22) Filed: Dec. 24, 2019

(65) Prior Publication Data
US 2020/0207942 A1 Jul. 2, 2020

(30) Foreign Application Priority Data
Dec. 27, 2018 (KR) .................. 10-2018-0171051

(51) Int. Cl.
| | | |
|---|---|---|
| *H01M 4/02* | (2006.01) | |
| *C08K 3/22* | (2006.01) | |
| *C08L 23/06* | (2006.01) | |
| *C09K 19/38* | (2006.01) | |
| *H01M 50/138* | (2021.01) | |

(Continued)

(52) U.S. Cl.
CPC ............. *C08K 3/22* (2013.01); *C08L 23/06* (2013.01); *C09K 19/38* (2013.01); *H01M 50/138* (2021.01); *C08K 2003/2206* (2013.01); *C08K 2003/2217* (2013.01); *H01M 50/103* (2021.01); *H01M 50/105* (2021.01); *H01M 50/107* (2021.01); *H01M 50/112* (2021.01); *H01M 50/119* (2021.01)

(58) Field of Classification Search
CPC ........................................................ H01M 4/02
See application file for complete search history.

(56) References Cited

U.S. PATENT DOCUMENTS

| | | |
|---|---|---|
| 6,528,145 B1 | 3/2003 | Berger et al. |
| 9,698,378 B2 | 7/2017 | Cho et al. |

(Continued)

FOREIGN PATENT DOCUMENTS

| | | |
|---|---|---|
| JP | 2000169754 A | 6/2000 |
| JP | 2013522075 A | 6/2013 |

(Continued)

OTHER PUBLICATIONS

David Karst, et al., "Using the Solubility Parameter to Explain Disperse Dye Sorption on Polylactide", J. Appl. Polym. Sci. 2005, 96, 416-422.

(Continued)

*Primary Examiner* — Jacob B Marks
(74) *Attorney, Agent, or Firm* — Cantor Colburn LLP

(57) ABSTRACT

A composite including a base polymer and a surface-treated inorganic moisture absorbent. The surface-treated inorganic moisture absorbent is surface-treated with a surface-treating agent having a solubility parameter difference of less than or equal to about 3.5 from that of the base polymer. An article including the composite, a battery case including the composite or the article, and a battery including the battery case and an electrode assembly including a positive electrode and a negative electrode.

20 Claims, 4 Drawing Sheets

(51) Int. Cl.
  *H01M 50/112*  (2021.01)
  *H01M 50/107*  (2021.01)
  *H01M 50/105*  (2021.01)
  *H01M 50/103*  (2021.01)
  *H01M 50/119*  (2021.01)

(56) References Cited

U.S. PATENT DOCUMENTS

| | | |
|---|---|---|
| 9,698,379 B2 | 7/2017 | Yoo et al. |
| 9,806,293 B2 | 10/2017 | Yoo et al. |
| 10,141,543 B2 | 11/2018 | Cho et al. |
| 2011/0247686 A1 | 10/2011 | Honeker et al. |

FOREIGN PATENT DOCUMENTS

| | | | |
|---|---|---|---|
| KR | 20020002216 A | | 1/2002 |
| KR | 20130081261 A | | 7/2013 |
| KR | 10184026 | * | 3/2018 |

OTHER PUBLICATIONS

Robert F. Fedors, "A Method for Estimating Both the Solubility Parameters and Molar Volumes of Liquids", Polym. Eng. Sci. 1974, 14, 147-154.

* cited by examiner

COMPOSITE, ARTICLE, BATTERY CASE, AND BATTERY

CROSS-REFERENCE TO RELATED APPLICATION

This application claims priority to Korean Patent Application No. 10-2018-0171051 filed in the Korean Intellectual Property Office on Dec. 27, 2018, and all the benefits therefrom under 35 U.S.C. § 119, the entire content of which is herein incorporated by reference.

BACKGROUND

1. Field

This disclosure relates to a composite, an article, a battery case, and a battery.

2. Description of the Related Art

As various types of mobile electronic device and various types of means of electric transportation such as commercial or passenger vehicles are developed, research on a case for protecting a power source for example, a battery for supplying electric power (or power) to the device or the means of transportation, from external moisture or impact is actively being made. Research on plastic materials that may replace a metal case to satisfy the same or similar level of moisture transmission resistivity and mechanical properties as a conventional metal case is of current interest and is actively being sought.

SUMMARY

An embodiment provides a composite having improved moisture transmission resistivity and mechanical properties.

Another embodiment provides an article including the composite.

Yet another embodiment provides a battery case including the composite or the article.

Still another embodiment provides a battery including the battery case.

In an embodiment, a composite includes a base polymer and a surface-treated inorganic moisture absorbent. The surface-treated inorganic moisture absorbent is surface-treated with a surface-treating agent having a solubility parameter difference of less than or equal to about 3.5 from that of the base polymer.

The surface-treated inorganic moisture absorbent may be surface-treated with a surface-treating agent having a solubility parameter difference of less than or equal to about 3.3 from that of the base polymer.

The surface-treating agent may be a compound, an oligomer, or a polymer which includes a group capable of being dissolved in water or alcohol to produce an anion at one terminal end and a hydrophobic group at another terminal end.

The group capable of being dissolved in water or alcohol to produce the anion may be a hydroxy group, a carboxylic acid group, a phosphoric acid group, or a sulfonic acid group.

The hydrophobic functional group may be an aliphatic hydrocarbon group, an alicyclic hydrocarbon group, an aromatic hydrocarbon group, (meth)acryloyl group, a halogen-substituted aliphatic hydrocarbon group, a halogen-substituted alicyclic hydrocarbon group, a halogen-substituted aromatic hydrocarbon group, or a combination thereof.

The base polymer may include polycarbonate, polyolefin, polyvinyl, polyamide, polyester, polyphenylene sulfide (PPS), polyphenylene ether, polyphenylene oxide, polystyrene, polyamide, a polycyclic olefin copolymer, an acrylonitrile-butadiene-styrene copolymer, a liquid crystal polymer (LCP), a mixture thereof, an alloy thereof, or a copolymer thereof.

The base polymer may include a high density polyethylene (HDPE) or a liquid crystal polymer (LCP).

The base polymer may include a liquid crystal polymer, and the liquid crystal polymer may include a liquid crystal aromatic polyester including a structural unit represented by Chemical Formula 1; a structural unit represented by Chemical Formula 2 and a structural unit represented by Chemical Formula 3; or a structural unit represented by Chemical Formula 1, a structural unit represented by Chemical Formula 2, and a structural unit represented by Chemical Formula 3:

  Chemical Formula 1

  Chemical Formula 2

  Chemical Formula 3

In Chemical Formulae 1 to 3, $Ar^1$, $Ar^2$, and $Ar^3$ are each independently a group including a substituted or unsubstituted C6 to C30 single aromatic group, a condensed ring of two or more substituted or unsubstituted C6 to C30 aromatic groups, or a group including two or more substituted or unsubstituted C6 to C30 aromatic groups that are linked by a single bond, —O—, —C(=O)—, —C(OH)$_2$—, —S—, or —S(O)$_2$—.

The base polymer may include a liquid crystal polymer, and the liquid crystal polymer may include a liquid crystal aromatic polyamide including a structural unit represented by Chemical Formula 4; a structural unit represented by Chemical Formula 5 and a structural unit represented by Chemical Formula 2; or a structural unit represented by Chemical Formula 4, a structural unit represented by Chemical Formula 5, and a structural unit represented by Chemical Formula 2:

  Chemical Formula 4

  Chemical Formula 5

  Chemical Formula 2

In Chemical Formulae 4, 5, and 2, $Ar^4$, $Ar^5$, and $Ar^2$ are each independently a group including a substituted or unsubstituted C6 to C30 single aromatic group, a condensed ring of two or more substituted or unsubstituted C6 to C30 aromatic groups, or a group including two or more substituted or unsubstituted C6 to C30 aromatic groups that are linked by a single bond, —O—, —C(=O)—, —C(OH)$_2$—, —S—, or —S(O)$_2$—.

The base polymer may include a liquid crystal polymer and a fluorinated resin.

The inorganic moisture absorbent may include a silica gel, zeolite, CaO, BaO, MgSO$_4$, Mg(ClO$_4$)$_2$, MgO, P$_2$O$_5$, Al$_2$O$_3$, CaH$_2$, NaH, LiAlH$_4$, CaSO$_4$, Na$_2$SO$_4$, CaCO$_3$, K$_2$CO$_3$, CaCl$_2$), Ba(ClO$_4$)$_2$, Ca, or a mixture of two or more.

The inorganic moisture absorbent may include CaO, MgO, zeolite, or a mixture thereof.

The surface-treated inorganic moisture absorbent may be included in an amount of less than or equal to about 20 wt %, based on a total weight of the composite.

The surface-treating agent may be attached to the surface of the inorganic moisture absorbent in an amount of less than about 50 parts by weight per 100 parts by weight of the inorganic moisture absorbent. The composite may further include an additional moisture barrier material including a crystal of the base polymer or a crystal of a polymer different from the base polymer, a particle of an inorganic material different from the inorganic moisture absorbent, or a fiber-shaped material.

An article according to another embodiment includes the composite.

The article may have a water vapor transmission rate (WVTR) of less than about 0.005 grams per square meter per day (g/m$^2$/day) when measured at a thickness of 1 mm at 38° C. under relative humidity of 100% according to ISO 15106 or ASTM F1249.

A battery case according to another embodiment includes the composite or the article.

The battery case may include a container configured to accommodate an electrode assembly, wherein the container includes a bottom wall and a plurality of side walls, the bottom wall and the side walls are integrated to have an open side opposite the bottom wall and to provide a space for accommodating the electrode assembly, and the container includes the composite or the article.

A battery according to another embodiment includes the battery case according to the embodiment and an electrode assembly including a positive electrode and a negative electrode accommodated in the container of the battery case.

In a composite according to an embodiment, moisture absorption performance of the inorganic moisture absorbent may be significantly improved as the surface-treated inorganic moisture absorbent may uniformly be dispersed in the base polymer, and the moisture transmission resistivity of the composite may be significantly improved. In addition, because the inorganic moisture absorbent and the base polymer are very well mixed (or uniformly mixed) in the composite, it is believed that the interface adherence of the two materials is improved, and mechanical properties of an article manufactured therefrom may be greatly improved. Accordingly, the article including the composite according to an embodiment, for example, a battery case has excellent moisture transmission resistivity and mechanical properties. The article for example a battery case is relatively light weight based on a polymer material, and thus may protect an electrode assembly from moisture and be usefully applied to a battery or battery module safely including at least one battery cell and the like.

DETAILED DESCRIPTION

Figure 1:
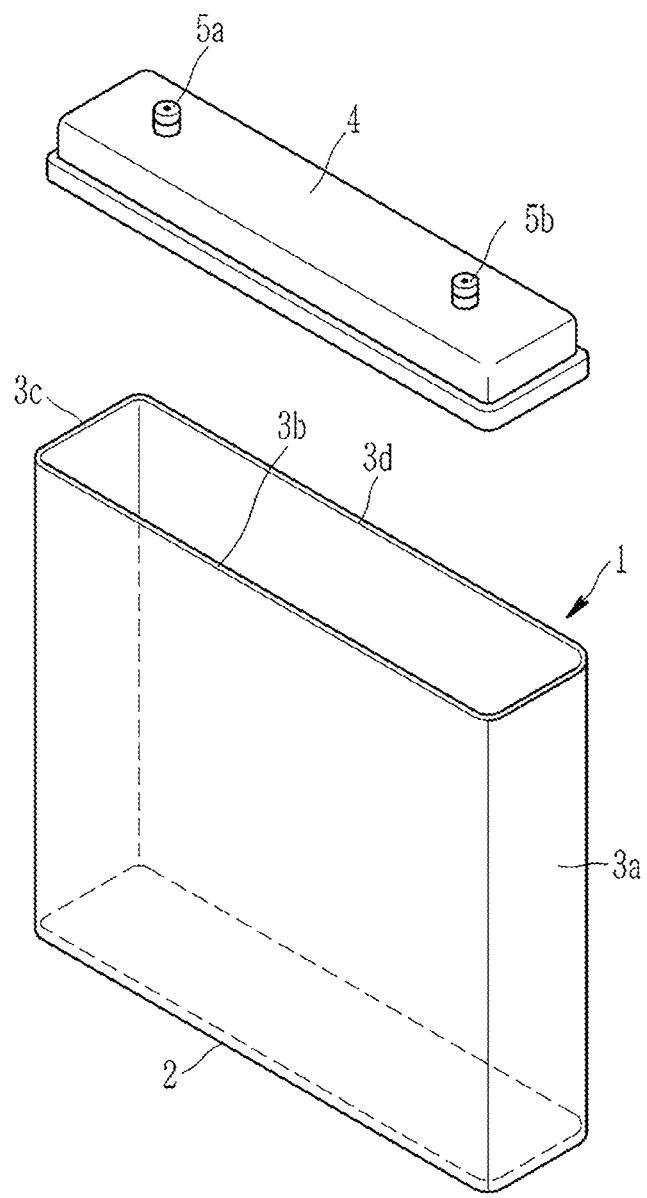
FIG. 1 is an exploded perspective view showing a battery case according to an embodiment.

Hereinafter, embodiments of the present invention are described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout. However, these embodiments are exemplary, the present invention is not limited thereto and the present invention is defined by the scope of claims.

If not defined otherwise, all terms (including technical and scientific terms) in the specification may be defined as commonly understood by one skilled in the art. The terms defined in a generally-used dictionary may not be interpreted ideally or exaggeratedly unless clearly defined. In addition, unless explicitly described to the contrary, the word "comprise" and variations such as "comprises" or "comprising" will be understood to imply the inclusion of stated elements but not the exclusion of any other elements.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

In the drawings, the thickness of each element is exaggerated for better comprehension and ease of description. Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

It will be understood that when an element such as a layer, film, region, or plate is referred to as being "on" another element, it can be directly on the other element or intervening elements may also be present. In contrast, when an element is referred to as being "directly on" another element, there are no intervening elements present.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Recently, research on an electric vehicle (EV) using at least one battery system to supply a part of or all of the motive power is actively being made. The electric vehicle discharges less emissions and less environmental contamination material compared to a traditional vehicle operated by an internal combustion engine, and thus, exhibits much higher fuel efficiency. Some electric vehicles using electricity use no gasoline at all and instead is motive powered entirely from electricity. As research on electric vehicles is increased, a demand for an improved electric power source, for example, an improved battery or battery module will also increase.

A rechargeable lithium battery capable of being charged and discharged and having high energy density is of present interest, and is considered an electrochemical device to provide motive power to electric vehicles. However, when moisture permeates the battery exterior case of a rechargeable lithium battery, hydrofluoric acid (HF) is generated and causes performance degradation of the battery, and in particular the battery electrode. Currently, to prevent moisture incursion and this performance degradation, an aluminum case material having a defined moisture transmission resistivity is used to house a rechargeable lithium battery. For example, an electrode assembly including positive and negative electrodes is inserted into a case such as an aluminum pouch, and then into an aluminum can and sealed to make a battery cell, and a plurality of the battery cells is used to form a battery module. Accordingly, this production process can result in a complicated assembly process, e.g., lengthy fabrication times, and high cost, and therefore, there remains interest to improve the assembly process. Research is underway to realize a battery case and battery that may be manufactured in less time or at less cost by accommodating an electrode assembly in a cell-module integrated case without the need to construct a separate battery cell after manufacturing the electrode assembly. However, to realize such a cell-module integrated structure the development of a battery case with sufficient mechanical strength and moisture transmission resistivity is sought and needed.

Since a battery case formed of a conventional metal has a limited shape due to a limit in terms of a metal manufacture technology, a battery case having a desired shape and/or size requires a multistep process, a relatively high cost, and a long manufacture time. In addition, larger metal cases are heavy due to the weight of the metal, and if a plurality of containers are included in order to house a plurality of battery cells, the battery becomes very heavy and more expensive. Accordingly, there is a continuing need for an efficient battery case and battery module using the same capable of solving the problems of heat management, moisture transmission, and the like, and one that can be manufactured with a lower cost, having improved mechanical properties, and having less complicated assembly process.

A battery case using a polymer resin that may be easily manufactured in a desired form is of interest. However, a polymer resin generally will have a lower moisture transmission resistivity, and less robust mechanical properties than a metal case, and therefore, the interest and development of a polymer-based material that meet higher mechanical properties and moisture transmission resistivity remains a technical problem to be addressed.

The development of a polymer based battery case can include an addition of an inorganic moisture absorbent to a base polymer to improve moisture transmission resistivity. However, if the inorganic moisture absorbent and the base polymer are not uniformly mixed, e.g., the moisture absorbent is not uniformly dispersed in the base polymer, because of differences in surface properties between the two materials one can see a deterioration in mechanical properties of the composite or the article. For example, if an inorganic moisture absorbent is added to a polymer material to improve moisture transmission resistivity, there will, in general, be a trade-off relationship between the moisture transmission resistivity and the mechanical properties. Accordingly, it remains a technical challenge to simultaneously improve the moisture transmission resistivity and the mechanical properties of the modified polymer material.

We describe our efforts to develop a polymer composite material(s) that exhibit little or no deterioration, or in some instances a slight improvement, in mechanical properties compared to a similar polymer composite that does not include the inorganic moisture absorbent. Accordingly, we seek novel polymer composites that balance this trade-off relationship between moisture transmission resistivity and the mechanical properties. To achieve this technical objective, we describe an inorganic moisture absorbent that is surface-treated with a material having a solubility parameter difference of less than or equal to about 3.5 from that of the base polymer, and we find that the moisture transmission resistivity and mechanical properties of a composite prepared therefrom can achieve proper balance and in some instances improvement in moisture transmission resistivity and mechanical properties.

The composite according to an embodiment includes a base polymer and a surface-treated inorganic moisture absorbent. The surface-treated inorganic moisture absorbent is obtained through a surface treatment with a surface-treating agent having a solubility parameter difference of less than or equal to about 3.5 from that of the base polymer.

The surface-treated inorganic moisture absorbent may be an inorganic moisture absorbent that is surface-treated with a surface-treating agent having a solubility parameter difference from that of the base polymer of less than or equal to about 3.5, for example, less than or equal to about 3.4, less than or equal to about 3.3, less than or equal to about 3.2, less than or equal to about 3.0, less than or equal to about 2.8, less than or equal to about 2.7, less than or equal to about 2.5, less than or equal to about 2.4, less than or equal to about 2.3, less than or equal to about 2.2, less than or equal to about 2.0, less than or equal to about 1.8, less than or equal to about 1.7, less than or equal to about 1.5, less than or equal to about 1.3, less than or equal to about 1.0, less than or equal to about 0.8, less than or equal to about 0.7, less than or equal to about 0.5, less than or equal to about 0.3, or less than or equal to about 0.1, but is not limited thereto.

When the inorganic moisture absorbent is surface-treated with a material having a solubility parameter difference of less than or equal to about 3.5 from that of the base polymer, the surface-treated inorganic moisture absorbent and the base polymer may be regarded to have a similar solubility parameter. Because the two materials have a similar solubility parameter a uniform or well dispersed mixture of the two material can be obtained. Moreover, with a smaller solubility parameter difference one sees better uniformity of the inorganic moisture absorbent and base polymer. A method of measuring the solubility parameter is described in detail with respect to Relationship Equation 1 in the Example section.

As for the composite including a base polymer and an inorganic moisture absorbent surface-treated with a material having a solubility parameter difference of less than or equal to about 3.5 from that of the base polymer, the base polymer and the surface-treated inorganic moisture absorbent are uniformly well mixed. We believe that the improvement in compatibility and therefore, improvement in uniformity of the material results not only in an improvement of the moisture transmission resistivity of the polymer composite, but also, greater adherence at the interface of these two materials is believed to maintain or even improve the mechanical properties such as impact strength of the composite, compared to a similar composite that includes a similar amount of inorganic moisture absorbent that was not surface treated as described herein. In addition, even if compared to an article prepared from only the base polymer (i.e., no inorganic moisture absorbent), the mechanical properties of an embodied composite may exhibit improved or at least equivalent mechanical properties to the base polymer. Accordingly, a composite including an inorganic moisture absorbent to improve moisture transmission resistivity and having no mechanical properties deterioration is now possible and provided herein.

The surface-treating agent with a solubility parameter difference of less than or equal to about 3.5 from that of the base polymer may be a compound, an oligomer, or a polymer. In particular, the surface-treating agent can include a group that when the agent is dissolved in water or alcohol an anion at one terminal end and a hydrophobic group at another terminal end of the compound, an oligomer, or a polymer is produced or formed. For example, in an essentially linear surface-treating agent is used having a first terminal end and a second terminal end, an anion may be produced at the first terminal end and a hydrophobic group at the second terminal end.

Without wishing to be bound by a specific theory, if the surface-treating agent includes a group that when the agent is dissolved in water or alcohol and forms an anion at one terminal end, and is dissolved in a solvent that includes an inorganic moisture absorbent for a surface treatment, a terminal end forms an anion and the surface of the inorganic moisture absorbent becomes cationic. Accordingly, through an "acid-base" reaction or interaction, the surface-treating agent is chemically combined with the surface of the inorganic moisture absorbent. The surface-treating agent will also include a hydrophobic group at another terminal end, which does not interact with the surface of the inorganic moisture absorbent but has similar properties to those of the base polymer. Accordingly, the inorganic moisture absorbent becomes surrounded by the surface-treating agent with one terminal end interacting with the surface of the inorganic moisture absorbent, and another terminal end mixing or interacting with the base polymer resulting in the improved dispersion of the absorbent in the base polymer. Accordingly, the composite including the inorganic moisture absorbent surface-treated with the surface-treating agent along with the base polymer may be present as a uniform mixture. Accordingly, the composite may have improved moisture transmission resistivity, and simultaneously, improved mechanical properties.

The group capable of being dissolved in water or alcohol to produce the anion may be, for example, a hydroxy group, a carboxylic acid group, a phosphoric acid group, or a sulfonic acid group, but is not limited thereto. As used herein, an "alcohol" is a compound of the formula ROH wherein R is an organic group, for example a C1-030 organic group, preferably a C1-C12 or organic group. In an embodiment, the alcohol is at least partially miscible with water. Examples of suitable alcohols include methanol, ethanol, n-propanol, isopropanol, and n-butanol.

The hydrophobic functional group may include an aliphatic hydrocarbon group, an alicyclic hydrocarbon group, an aromatic hydrocarbon group, a (meth)acryloyl group, a halogen-substituted aliphatic hydrocarbon group, a halogen-substituted alicyclic hydrocarbon group, a halogen-substituted aromatic hydrocarbon group, or a combination thereof, and may include for example, a linear or branched C1 to C30 alkyl group, a C3 to C30 cycloalkyl group, a C2 to C30 alkenyl group having at least one double bond, a C2 to C30 alkynyl group having at least one triple bond, a C6 to C30 aryl group, a C7 to C30 arylalkyl group, a C7 to C30 alkylaryl group, a C10 to C30 cycloalkylaryl group, a (meth)acryloyl group, a fluorinated alkyl group, a fluorinated cycloalkyl group, a fluorinated aryl group, or a combination thereof, but is not limited thereto.

An organic group having both of hydrophobicity and hydrophilicity, for example, an alkylene oxide group, for example, an ethylene oxide group, a propylene oxide group, or a carbonyl ethylene oxide group, or a carbonyl propylene oxide group, which is not limited thereto, may exist between the terminal end including the group capable of being dissolved in water or alcohol to produce the anion and the terminal end including the hydrophobic functional group.

As described in detail in the Examples described below, before preparing the composite according to an embodiment, the surface-treated inorganic moisture absorbent may be prepared by putting the surface-treating agent in an appropriate solvent and dissolving it therein, adding the inorganic moisture absorbent, dispersing it with an ultrasonic wave and the like, and aging this solution for predetermined time to combine the surface-treating agent with the inorganic moisture absorbent. This surface-treated inorganic moisture absorbent is purified through filtering, cleaning, drying, and the like, and then, mixed with the base polymer to prepare the composite. The method of producing the surface-treated inorganic moisture absorbent is not limited to the described method, and it may also be produced by any method known to those skilled in the art. All such variations and modifications will fall into the scope of the present disclosure.

The obtained surface-treated inorganic moisture absorbent may be easily mixed with the base polymer to obtain a composite by using methods well known to those skilled in the art. For example, as in examples which will be described below, a mixture of the base polymer and the surface-treated inorganic moisture absorbent is fed into a twin-screw extruder through a hopper and heated at a high temperature, for example, at about 250° C. to about 300° C., then melt-extruded at about 30 rpm, and cut through a pelletizer to obtain a composite pellet.

The base polymer may include polycarbonate, polyolefin, polyvinyl, polyamide, polyester, polyphenylene sulfide (PPS), polyphenylene ether, polyphenylene oxide, polystyrene, polyamide, a polycyclic olefin copolymer, an acrylonitrile-butadiene-styrene copolymer, a liquid crystal polymer (LCP), a mixture thereof, an alloy thereof, or a copolymer thereof.

In an example embodiment, the base polymer may include a high density polyethylene (HDPE) or a liquid crystal polymer (LCP), but is not limited thereto.

The liquid crystal polymer includes an aromatic polyester which is known as an engineering plastic and to have high heat resistance mechanical properties, and a moisture transmission resistivity by itself. However, the requirements of high mechanical properties and moisture transmission resistivity for the battery case may be not satisfied by only the conventional liquid crystal polymer. Accordingly, there has been an effort to improve the moisture transmission resistivity by adding the inorganic moisture absorbent to the liquid crystal polymer. However, as described above, when the liquid crystal polymer is simply mixed with the inorganic moisture absorbent, moisture transmission resistivity of a composite prepared therefrom may increase, but mechanical properties such as impact strength and the like may deteriorate. However, in the composite according to an embodiment, the inorganic moisture absorbent is surface-treated with the surface-treating agent, and then, mixed with the base polymer such as a liquid crystal polymer and the like, and accordingly, moisture transmission resistivity may not only be improved due to increased dispersibility between these two materials, but also mechanical properties such as impact strength and the like may also be improved or maintained equivalently to those of a case of including no inorganic moisture absorbent.

In an exemplary embodiment, the base polymer may include a liquid crystal polymer, and the liquid crystal polymer may include a liquid crystal aromatic polyester. The liquid crystal aromatic polyester may include a structural unit represented by Chemical Formula 1; a structural unit represented by Chemical Formula 2 and a structural unit represented by Chemical Formula 3; or a structural unit represented by Chemical Formula 1, a structural unit represented by Chemical Formula 2, and a structural unit represented by Chemical Formula 3:

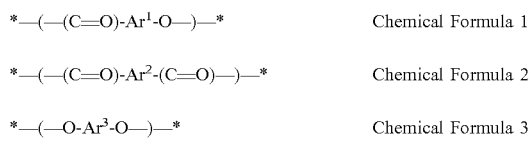

In Chemical Formulae 1 to 3, $Ar^1$, $Ar^2$, and $Ar^3$ are each independently a group including a substituted or unsubstituted C6 to C30 aromatic group, for example, a substituted or unsubstituted C6 to C30 single aromatic ring group, a condensed ring of two or more substituted or unsubstituted C6 to C30 aromatic groups, or a group including two or more substituted or unsubstituted C6 to C30 aromatic rings that are linked by a single bond, —O—, —C(=O)—, —C(OH)$_2$—, —S—, or —S(O)$_2$—.

For example, $Ar^1$, $Ar^2$, and $Ar^3$ of Chemical Formulae 1 to 3 may each independently be a substituted or unsubstituted phenylene group, a biphenylene group, a naphthylene group, an anthracenylene group, a phenanthrenylene group, a naphthacenylene group, a pyrenylene group, and the like, for example, a phenylene group, a biphenylene group, or a naphthylene group, but are not limited thereto.

The structural unit represented by Chemical Formula 1 may be derived from aromatic hydroxycarboxylic acid, and the aromatic hydroxycarboxylic acid may be any one of 4-hydroxybenzoic acid, glycolic acid, 6-hydroxy-2-naphthoic acid, 6-hydroxy-1-naphthoic acid, 3-methyl-4-hydroxybenzoic acid, 3,5-dimethyl-4-hydroxybenzoic acid, 2,6-dimethyl-4-hydroxybenzoic acid, 3-methoxy-4-hydroxybenzoic acid, 3,5-dimethoxy-4-hydroxybenzoic acid, 6-hydroxy-5-methyl-2-naphthoic acid, 6-hydroxy-5-methoxy-2-naphthoic acid, 2-chloro-4-hydroxybenzoic acid, 3-chloro-4-hydroxybenzoic acid, 2,3-dichloro-4-hydroxybenzoic acid, 3,5-dichloro-4-hydroxybenzoic acid, 2,5-dichloro-4-hydroxybenzoic acid, 3-bromo-4-hydroxybenzoic acid, 6-hydroxy-5-chloro-2-naphthoic acid, 6-hydroxy-7-chloro-2-naphthoic acid, 6-hydroxy-5,7-dichloro-2-naphthoic acid, or p-β-hydroxyethoxybenzoic acid, for example, 4-hydroxybenzoic acid and/or 6-hydroxy-2-naphthoic acid, but is not limited thereto.

The structural unit represented by Chemical Formula 2 may be derived from aromatic dicarboxylic acid, and the aromatic dicarboxylic acid may be any one of terephthalic acid, 4,4'-biphenyldicarboxylic acid, 4,4'-terphenyldicarboxylic acid, 1,6-naphthalene dicarboxylic acid, 2,6-naphthalene dicarboxylic acid, 1,4-naphthalene dicarboxylic acid, 2,7-naphthalene dicarboxylic acid, diphenyl ether-4,4'-dicarboxylic acid, diphenoxyethane-4,4'-dicarboxylic acid, diphenoxy butane-4,4'-dicarboxylic acid, diphenyl ethane-4,4'-dicarboxylic acid, isophthalic acid, diphenyl ether-3,3'-dicarboxylic acid, diphenoxyethane-3,3'-dicarboxylic acid, diphenyl ethane-3,3'-dicarboxylic acid, chloro terephthalic acid, dichloroterephthalic acid, dichloroisophthalic acid, bromo terephthalic acid, methylterephthalic acid, dimethylterephthalic acid, ethyl terephthalic acid, methoxy terephthalic acid, or ethoxyterephthalic acid, for example, terephthalic acid, isophthalic acid, naphthalene dicarboxylic acid, or a combination thereof, but is not limited thereto.

The structural unit represented by Chemical Formula 3 may be derived from aromatic diol, and the aromatic diol may be any one of catechol, resorcinol, hydroquinone, 4,4'-dihydroxybiphenyl, 2,2-bis(4'-β-hydroxyethoxyphenyl) propane, bis(4-hydroxyphenyl) sulfone, bis(4-β-hydroxyethoxyphenyl) sulfonic acid, 9,9'-bis(4-hydroxyphenyl) fluorene, 3,3'-dihydroxybiphenyl, 4,4'-dihydroxyterphenyl, 2,6-naphthalenediol, 4,4'-dihydroxydiphenyl ether, bis(4-hydroxyphenoxy) ethane, 3,3'-dihydroxydiphenyl ether, 1,6-naphthalenediol, 2,2-bis(4-hydroxyphenyl) propane, bis(4-hydroxyphenyl) methane, chloro hydroquinone, methylhydroquinone, tert-butyl hydroquinone, phenyl hydroquinone, methoxy hydroquinone, phenoxy hydroquinone, 4-chloro resorcinol, or 4-methyl resorcinol, for example, hydroquinone, 4,4'-dihydroxybiphenyl, or a combination thereof, but is not limited thereto.

In an example embodiment, the liquid crystal aromatic polyester may include the structural unit represented by Chemical Formula 1, that is, a structural unit derived from aromatic hydroxycarboxylic acid, and the aromatic hydroxycarboxylic acid may include hydroxybenzoic acid (HBA) and/or 6-hydroxy-2-naphthoic acid (HNA).

In another example embodiment, the liquid crystal aromatic polyester may include the structural unit represented by Chemical Formula 1, that is, a structural unit derived from aromatic hydroxycarboxylic acid, the structural unit represented by Chemical Formula 2, that is, a structural unit derived from aromatic dicarboxylic acid, and the structural unit represented by Chemical Formula 3, that is, a structural unit derived from aromatic diol. The aromatic hydroxycarboxylic acid may include hydroxybenzoic acid (HBA), the aromatic dicarboxylic acid may include isophthalic acid (IPA) and/or terephthalic (TPA), and the aromatic diol may include hydroquinone (HQ) and/or 4,4'-biphenol (BP).

In another example embodiment, the base polymer may include a liquid crystal polymer, and the liquid crystal polymer may include a liquid crystal aromatic polyamide. The liquid crystal aromatic polyamide may include a structural unit represented by Chemical Formula 4, or a structural unit represented by Chemical Formula 5, and the structural unit represented by Chemical Formula 2; or the structural unit represented by Chemical Formula 4 and the structural unit represented by Chemical Formula 5, and the structural unit represented by Chemical Formula 2:

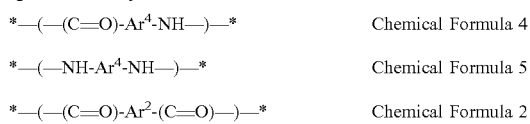

In Chemical Formula 4, Chemical Formula 5, and Chemical Formula 2, $Ar^4$, $Ar^5$, and $Ar^2$ are each independently a group including a substituted or unsubstituted C6 to C30 aromatic group, for example, a single substituted C6 to C30 aromatic ring group, a condensed ring of two or more substituted or unsubstituted C6 to C30 aromatic ring groups, or a group including two or more substituted or unsubstituted C6 to C30 aromatic ring groups that are linked by a single bond, —O—, —C(=O)—, —C(OH)$_2$—, —S—, or —S(O)$_2$—.

For example, $Ar^4$, $Ar^5$, and $Ar^2$ of Chemical Formula 4, Chemical Formula 5, and Chemical Formula 2 may each independently be a phenylene group, biphenylene group, a naphthylene group, an anthracenylene group, phenanthrenylene group, a naphthacenylene group, a pyrenylene group, and the like, for example, a phenylene group, a biphenylene group, or a naphthylene group, but are not limited thereto.

The structural unit represented by Chemical Formula 4 may be derived from aromatic amino carboxylic acid, and the aromatic amino carboxylic acid may be, for example, 4-aminobenzoic acid, 2-amino-naphthalene-6-carboxylic acid, 4-aminobiphenyl-4-carboxylic acid, or a combination thereof, but is not limited thereto.

The structural unit represented by Chemical Formula 5 may be derived from aromatic diamine, and the aromatic diamine may be any one of 1,4-phenylene diamine, 1,3-phenylene diamine, 2,6-naphthalene diamine, N,N,N',N'-tetramethyl-1,4-diaminobenzene, N,N,N',N'-tetramethyl-1,3-diaminobenzene, 1,8-bis(dimethylamino)naphthalene, or 4,5-bis(dimethylamino) fluorene, for example, 1,4-phenylene diamine, 1,3-phenylene diamine, 2,6-naphthalene diamine, or a combination thereof, but is not limited thereto.

The structural unit represented by Chemical Formula 2 may be derived from the above-described aromatic dicarboxylic acid, and the aromatic dicarboxylic acid may be, for example, terephthalic acid, isophthalic acid, naphthalene dicarboxylic acid, or a combination thereof.

In another example embodiment, the base polymer may include a high density polyethylene. The high density polyethylene (HDPE) is polyethylene having a density of about 930 kg/m$^3$ to about 970 kg/m$^3$ and having little branch, and therefore having stronger intermolecular forces and tensile strengths than a low density polyethylene (LDPE). However, a high density polyethylene generally has a slightly lower moisture transmission resistivity than the liquid crystal polymer. Therefore, if the high density polyethylene is included as a base polymer, the inorganic moisture absorbent may be included in a higher amount than when a liquid crystal polymer is used as a base polymer, in order to achieve a moisture transmission resistivity required for a battery case. However, as the inorganic moisture absorbent is included in relatively large amounts, mechanical properties such as impact strength may decrease, but because the composite according to an embodiment uses a surface-treated inorganic moisture absorbent and also includes a high density polyethylene (HDPE) as a base polymer, the surface-treated inorganic moisture absorbent can present in the much larger amount, and the mechanical properties of the composite are not greatly diminished.

The base polymer may further include a fluorinated resin. The fluorinated resin may be polytetrafluoroethylene (PTFE), polyvinylidene fluoride (PVDF), polychlorotrifluoroethylene (PCTFE), or a mixture thereof or a copolymer, but is not limited thereto. If the base polymer further includes the fluorinated resin, a water vapor transmittance rate of the container of the battery case produced therefrom may be further lowered. The fluorinated resin has hydrophobicity, and thus, if included in an amount of less than or equal to about 20 wt %, for example, less than or equal to about 15 wt %, less than or equal to about 10 wt %, for example, about 3 wt % to about 10 wt % or about 5 wt % to about 10 wt %, based on a total weight of the composite, an article produced therefrom will have an effect of blocking moisture from the surface of the article that is in contact with the outside air.

The surface-treated inorganic moisture absorbent may include at least one of a silica gel, zeolite, CaO, BaO, $MgSO_4$, $Mg(ClO_4)_2$, MgO, $P_2O_5$, $Al_2O_3$, $CaH_2$, NaH, $LiAlH_4$, $CaSO_4$, $Na_2SO_4$, $CaCO_3$, $K_2CO_3$, $CaCl_2$), $Ba(ClO_4)_2$, Ca, or a combination thereof, but is not limited thereto. Various types of inorganic moisture absorbents known in the art may be used without limitation.

In an example embodiment, the inorganic moisture absorbent may include zeolite, CaO, MgO, or a combination thereof, but is not limited thereto.

Zeolite having various pore sizes is commercially available, and when the composite according to an embodiment includes zeolite as the inorganic moisture absorbent, the zeolite having a pore size ranging from about 3 angstroms (Å) to about 10 Å, for example, about 3 Å to about 8 Å, about 3 Å to about 7 Å, or about 3 Å to about 5 Å may be used. As a water molecule has a size of about 3.8 Å, the water molecule may be easily trapped in the pore of the zeolite. In addition, the zeolite may have an average particle diameter ranging from about 2 micrometers (μm) to about 10 μm and include aluminum in an amount of greater than or equal to about 40 weight percent (wt %). If the amount of aluminum is within the above range, one may exhibit excellent hygroscopicity.

When the inorganic moisture absorbent is CaO, a particle size of CaO may be about 0.1 μm to about 20 μm, for example, about 0.1 μm to about 15 μm, about 0.1 μm to about 10 μm, about 0.1 μm to about 8 μm, about 0.1 μm to about 7 μm, about 0.1 μm to about 6 μm, about 0.1 μm to about 5 μm, about 0.1 μm to about 4 μm, about 0.1 μm to about 3 μm, about 0.1 μm to about 2 μm, or about 0.1 μm to about 1 μm, but is not limited thereto. If the particle size of CaO is greater than about 20 μm, the moisture transmission resistivity may tend to decrease.

Zeolite is a physical moisture absorbent absorbing water through a particle having a pore, while CaO is a chemical water adsorbent adsorbing water through a chemical reaction with a water molecule. Accordingly, in an example embodiment, the inorganic moisture absorbent, zeolite and CaO may be combined and used together in the polymer composite. In this case, the zeolite and CaO may be surface-treated with the surface-treating agent before forming the composite.

The inorganic moisture absorbent may be included in an amount of less than or equal to about 20 wt %, for example, less than or equal to about 19 wt %, less than or equal to about 18 wt %, or less than or equal to about 15 wt %, for example about 1 wt % to about 18 wt %, about 1 wt % to about 15 wt %, about 2 wt % to about 18 wt %, about 2 wt % to about 15 wt %, about 2 wt % to about 13 wt %, about 3 wt % to about 15 wt %, about 3 wt % to about 13 wt %, about 3 wt % to about 10 wt %, about 5 wt % to about 10 wt %, or about 5 wt % to about 8 wt % based on a total weight of the composite, but is not limited thereto.

When the amount of the inorganic moisture absorbent is within the above ranges, the composite produced therefrom may exhibit improved moisture transmission resistivity and mechanical properties.

The surface-treating agent may be attached to the surface of the inorganic moisture absorbent in an amount of less than about 50 parts by weight per 100 parts by weight of the inorganic moisture absorbent. For example, the surface-treating agent may be attached to the surface of the inorganic moisture absorbent in an amount of less than or equal to about 45 parts by weight, for example, less than or equal to about 40 parts by weight, less than or equal to about 38 parts by weight, less than or equal to about 35 parts by weight, or less than or equal to about 30 parts by weight per 100 parts by weight of the inorganic moisture absorbent. In addition, the surface-treating agent may be attached to the surface of the inorganic moisture absorbent in an amount of about 5 parts by weight to about 45 parts by weight, for example, about 5 parts by weight to about 40 parts by weight, about 5 parts by weight to about 35 parts by weight, about 10 parts by weight to about 40 parts by weight, about 10 parts by weight to about 35 parts by weight, about 10 parts by weight to about 30 parts by weight, about 15 parts by weight to about 45 parts by weight, about 15 parts by weight to about 40 parts by weight, about 15 parts by weight to about 35 parts by weight, about 15 parts by weight to about 30 parts by weight, about 15 parts by weight to about 25 parts by weight, about 18 parts by weight to about 45 parts by weight, about 18 parts by weight to about 40 parts by weight, about 18 parts by weight to about 35 parts by weight, about 18 parts by weight to about 30 parts by weight, about 20 parts by weight to about 45 parts by weight, about 20 parts by weight to about 40 parts by weight, about 20 parts by weight to about 35 parts by weight, about 20 parts by weight to about 30 parts by weight, about 25 parts by weight to about 45 parts by weight, about 25 parts by weight to about 40 parts by weight, about 25 parts by weight to about 35 parts by weight, or about 25 parts by weight to about 30 parts by weight per 100 parts by weight of the inorganic moisture absorbent, but is not limited thereto.

As the surface-treating agent is surface-treated on the surface of the inorganic moisture absorbent in the amount of the above ranges, the composite according to an embodiment may maintain excellent moisture transmission resistivity and mechanical properties.

The composite may also include materials known as moisture barrier materials in addition to the base polymer and the surface-treated inorganic moisture absorbent. Such a moisture barrier material may further include, for example, a crystal of the base polymer or a crystal of a polymer different from the base polymer, a particle of an inorganic material different from the inorganic moisture absorbent, or fiber-shaped material, such as, a glass fiber or a carbon fiber. Specific examples of the moisture barrier material may include wollastonite, mica, an inorganic whisker, such as, for example, a metallic whisker or a mineral whisker, barium sulfate, kaolin, talc, nanoclay, a carbon fiber or a glass fiber having an aspect ratio of greater than or equal to about 10, or a mixture thereof, but are not limited thereto.

In another embodiment, an article including the composite is provided.

As described above, because the composite according to an embodiment includes the surface-treated inorganic moisture absorbent, moisture transmission resistivity of an article manufactured therefrom may not only improve or increase compared with those of an article manufactured from a base polymer, but also further improve or increase compared with those of an article manufactured from a composite including a non-surface-treated inorganic moisture absorbent. For example, an article manufactured from a composite including a liquid crystal polymer as a base polymer and a non-surface treated inorganic moisture absorbent may have a water vapor transmission rate (WVTR) of greater than or equal to about 0.005 g/m²/day at a thickness of 1 mm at 38° C. under relative humidity of 100% according to ISO 15106 or ASTM F1249. Herein, the water vapor transmittance rate of the article manufactured from the composite according to an embodiment may be less than about 0.005 g/m²/day, for example, greater than or equal to about 0.004 g/m²/day, less than or equal to about 0.0035 g/m²/day, or less than or equal to about 0.003 g/m²/day but is not limited thereto.

The aqueous vapor transmittance rate may be dependent on a type of the base polymer and/or a type and an amount of the inorganic moisture absorbent or the surface-treating agent, but when an article is manufactured by including the same base polymer and the same inorganic moisture absorbent respectively in the same amount, a case of using the inorganic moisture absorbent surface-treated with the surface-treating agent may exhibit overall increased moisture transmission resistivity and greatly improved mechanical properties compared with a similar case prepared with a non-surface-treated inorganic moisture absorbent.

In this way, an article according to an embodiment includes the composite, and thereby moisture transmission resistivity may not only be increased, but also mechanical properties, for example, impact strength may be increased or maintained equivalently to those of an article manufactured from a base polymer including no inorganic moisture absorbent. Because it is very difficult to simultaneously increase moisture transmission resistivity and mechanical properties or maintain mechanical properties as well as increase moisture transmission resistivity, the observed result is quite surprising. Accordingly, the article according to an embodiment may be applied to various uses requiring excellent mechanical properties such as durability, impact strength, and the like, as well as suppress permeation of external moisture.

Accordingly, in another embodiment, a battery case including the article according to the embodiment may be provided.

A battery case according to an embodiment includes a container configured to accommodate an electrode assembly, wherein the container includes a bottom wall and a plurality of side walls, the bottom wall and the side walls are integrated to have an open side opposite to the bottom wall and to provide a space for accommodating the electrode assembly, and the container includes the composite or the article according to an embodiment.

The composite or the article according to the embodiment is the same as described above, so that detailed descriptions thereof will be omitted.

As described above, because the container of the battery case according to an embodiment includes the composite or the article to the embodiment, the container or the battery case may have excellent moisture transmission resistivity. The moisture transmission resistivity of the container or the battery case may be as much as moisture transmission resistivity of the conventional metal pouch exterior material surrounding an electrode assembly for a rechargeable lithium battery assembly. As the container includes a space accommodating an electrode assembly including a positive electrode and a negative electrode and has the above-mentioned moisture transmission resistivity, an additional exterior material, such as a metal pouch and the like, surrounding the electrode assembly is not needed, the electrode assembly may be directly introduced into the battery container to provide a battery.

In addition, according to an example embodiment, the battery container may include a plurality of cell compartments separated by at least one partition wall disposed in the space. Accordingly, even in the case of a battery module including a plurality of battery cells, by introducing each electrode assembly into each cell compartment in the battery container without the needs to surround each electrode assembly with a metal pouch or the like, it may simply provide a battery module including a plurality of battery cells. In other words, the battery case according to an embodiment may be a cell-module integrated battery case.

Conventionally, an electrode assembly including a positive and a negative electrode is formed, wrapped with a metal pouch having moisture transmission resistivity to form a battery cell, and then, packed in a metallic battery case to manufacture a battery module, which is complicated in terms of a process, takes a long time, and costs increasingly high. As described, the battery case according to an embodiment may directly accommodate an electrode assembly including a negative electrode and a positive electrode in the container without manufacturing a unit cell by using an additional metal pouch and the like. An electrolyte can then be injected to easily manufacture a cell-module integrated battery case. Therefore, the described composite and process may offer significant reduction in fabrication time and the cost savings, compared to the conventional case of using the metal battery case in terms of the cost and the time on manufacturing the same. As well, the battery case according to an embodiment includes a polymer material as a main component, so that it is light in weight and has shape freedom and may be formed in a low cost.

The battery case may further include, for example, a lid configured to cover at least one portion of the open side of the container and having at least one of a positive terminal and a negative terminal. The lid may have at least one of a positive terminal and a negative electrode terminal, for example, both of the positive terminal and the negative electrode terminal. The lid may include the same composite as the container or the lid may include a different material from the container.

The battery case according to an embodiment may be manufactured by molding the composite according to an embodiment. The composite including the base polymer and the surface-treated inorganic moisture absorbent may be molded according to the various molding methods known in this art, for example, extrusion molding, injection molding, blow molding, press molding, and the like, so as to provide a battery case according to an embodiment.

In an example embodiment, the composite may be obtained by a one-pot method of inputting all of the base polymer and the surface-treated inorganic moisture absorbent into one extruder, and extruding the same while melt blending at a high temperature. The obtained composite may be cut by a pelletizer or the like to provide a composite pellet. The composite pellet may be formed to a battery case having a desirable shape and size through the various known molding methods.

Hereinafter, a battery case according to an embodiment is described with reference to the appended drawings.

FIG. 1 is an exploded perspective view of a battery case according to an embodiment.

Referring to FIG. 1, a battery case according to an embodiment includes a container 1 including a bottom wall 2 and a plurality of (e.g., 3, 4, or greater) side walls 3a, 3b, 3c, and 3d that are integrated to provide a space for accommodating an electrode assembly. The container 1 has an open side opposed to the bottom wall 2 and an electrode assembly may be accommodated in the container 1 through the open side 2.

Herein, "integrated" indicates a state that the bottom wall is connected to the plurality of side walls one another, and thus all the other sides except for the open side provide one closed and sealed space. A method for this integration is not particularly limited but may include, for example, as described above, a method of preparing a composite from a base polymer and surface-treated inorganic moisture absorbent, and molding the composite to integrate the bottom wall and the plurality of side walls and to provide a container having a space for accommodating electrodes, or a method of separately molding the bottom wall and the plurality of side walls and then, connecting them in a publicly known method such as welding, boning, or the like. As described above, the method for integration is not limited to a particular method but may include various methods known to those who have ordinary skill in the art, through which a container of a battery case is fabricated to have a space for accommodating an electrode assembly by integrating the bottom wall and the plurality of side walls.

The battery case may further include a lid 4 to cover (e.g., seal) at least one portion, for example, a whole portion of the open side of the container 1. The lid 4 may have at least one of the positive terminal 5a and the negative terminal 5a (e.g., positive terminal and negative terminal). The lid 4 may include the same material as the container 1 or a different material from the container 1, and the battery case according to an example embodiment may be entirely sealed by covering the open side of the container 1 with the lid 4 and sealing the same.

Figure 2:
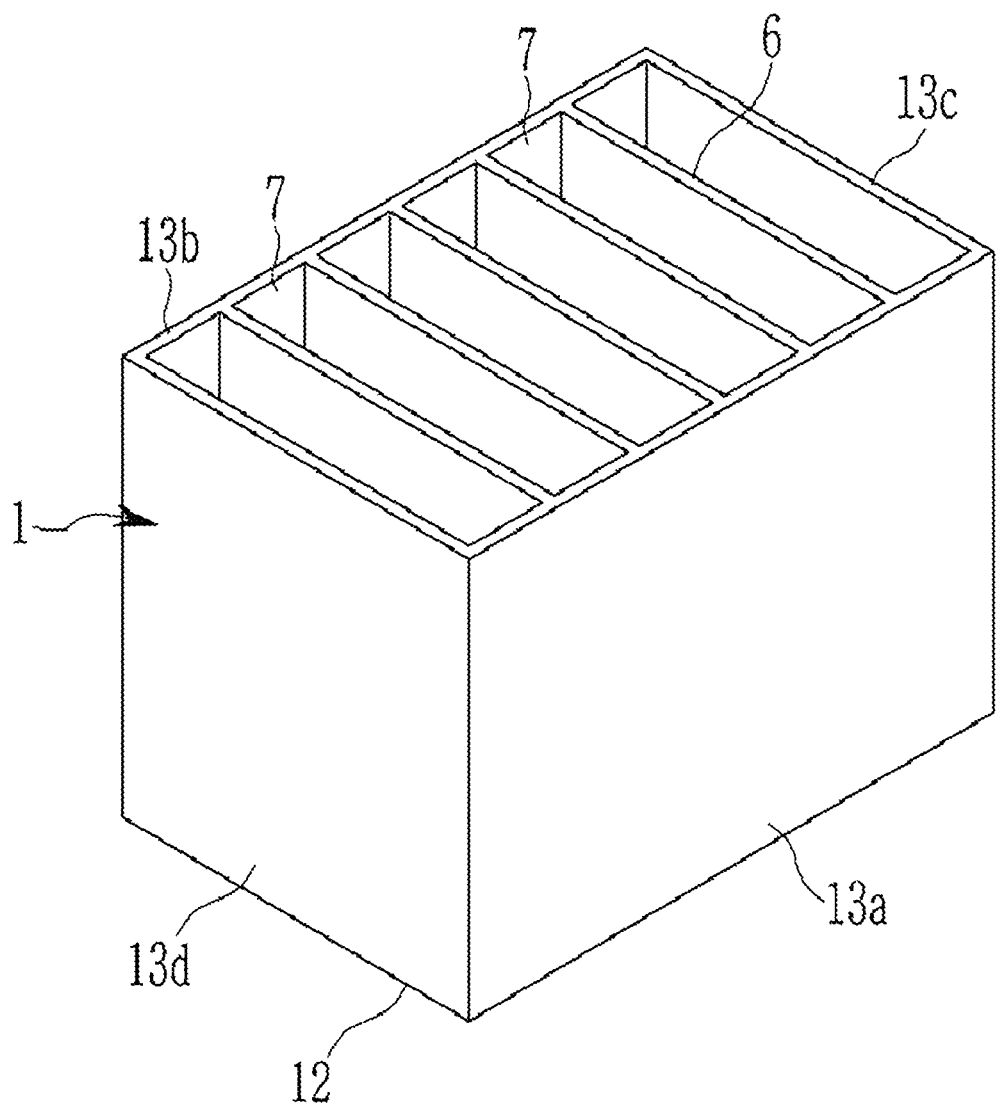
FIG. 2 is an exploded perspective view showing a battery case according to another embodiment.

FIG. 2 is an exploded perspective view of a battery case according to another embodiment.

Referring to FIG. 2, a container 1 of a battery case according to an example embodiment has a space formed by integrating a bottom wall 12 with a plurality of side walls (e.g., 3, 4, or more) 13a, 13b, 13c, and 13d and an open side facing the bottom wall 12, and in the space, at least one partition wall 6 (e.g., 2, 3, 4, 5, or more) is provided. Accordingly, the container may include a plurality of (e.g., greater than or equal to 2, for example, greater than or equal to 3, for example, greater than or equal to 4, or greater than or equal to 5) cell compartments 7 by the partition wall 6. Each battery cell compartment 7 may include the electrode assembly that will be described below, and a battery module may be fabricated by accommodating at least two electrode assemblies in each battery cell compartment and injecting an electrolyte solution therein. After disposing the electrode assembly and injecting the electrolyte solution, the open side of the container 1 may be closed or sealed with a lid, which is not shown.

FIGS. 1 and 2 show the container 1 of the battery case having a rectangular parallelepiped, but the battery case according to an embodiment has no limit to the shape but may have various shapes and sizes.

Another embodiment provides a battery including the battery case according to the embodiment and an electrode assembly accommodated in the container of the battery case and including a positive electrode and a negative electrode. Details for the battery case are the same as described above.

The electrode assembly includes a positive electrode, a negative electrode, and a separator disposed therebetween. The electrode assembly may further include, for example an aqueous non-aqueous electrolyte solution in the separator. The types of the electrode assembly are not particularly limited. In an embodiment, the electrode assembly may include an electrode assembly for a rechargeable lithium battery. The positive electrode, the negative electrode, the separator, and the electrolyte solution of the electrode assembly may be appropriately selected according to types of the electrode and are not particularly limited. Hereinafter, the electrode assembly for a rechargeable lithium battery is exemplified but the present disclosure is not limited thereto.

The positive electrode may include, for example, a positive active material disposed on a positive current collector and may further include at least one of a conductive material and a binder. The positive electrode may further include a filler. The negative electrode may include, for example a negative active material disposed on a negative current collector and may further include at least one of a conductive material and a binder. The negative electrode may further include a filler.

The positive active material may include, for example a (solid solution) oxide including lithium but is not particularly limited as long as it is a material capable of intercalating and de-intercalating lithium ions electrochemically. The positive active material may be a layered compound such as lithium cobalt oxide ($LiCoO_2$), lithium nickel oxide ($LiNiO_2$), and the like, a compound substituted with one or more transition metal; a lithium manganese oxide such as chemical formula $Li_{1+x}Mn_{2-x}O_4$ (wherein, x is 0 to 0.33), $LiMnO_3$, $LiMn_2O_3$, $LiMnO_2$, and the like; lithium copper oxide ($Li_2CuO_2$); vanadium oxide such as $LiV_3O_8$, $LiFe_3O_4$, $V_2O_5$, $Cu_2V_2O_7$, and the like; a Ni site-type lithium nickel oxide represented by chemical formula $LiMn_{2-x}MxO_2$ (wherein, M=Co, Mn, Al, Cu, Fe, Mg, B, or Ga and x=0.01 to 0.3); a lithium manganese composite oxide represented by chemical formula $LiMn_{2-x}M_xO_2$ (wherein, M=Co, Ni, Fe, Cr, Zn, or Ta and x=0.01 to 0.1) or $Li_2Mn_3MO_8$ (wherein, M=Fe, Co, Ni, Cu, or Zn); $LiMn_2O_4$ where a part of Li of chemical formula is substituted with an alkaline-earth metal ion; a disulfide compound; $Fe_2(MoO_4)_3$, and the like, but is not limited thereto.

Examples of the conductive material may be carbon black such as ketjen black, acetylene black, and the like, natural graphite, artificial graphite, and the like, but is not particularly limited as long as it may increase conductivity of the positive electrode.

The binder may be for example, polyvinylidene fluoride, an ethylene-propylene-diene terpolymer, a styrene-butadiene rubber, an acrylonitrile-butadiene rubber, a fluorine rubber, polyvinyl acetate, polymethylmethacrylate, polyethylene, nitrocellulose, and the like, but is not particularly limited as long as it may bind the (positive or negative) active material and the conductive material on the current collector. Examples of the binder may be polyvinyl alcohol, carboxylmethyl cellulose (CMC), starch, hydroxypropyl cellulose, recycled cellulose, tetrafluoroethylene, polyethylene, polypropylene, an ethylene-propylene-diene terpolymer (EPDM), sulfonated EPDM, a styrene-butene rubber, a fluorine rubber, various copolymers, polymeric highly saponified polyvinyl alcohol, and the like, in addition to the foregoing materials.

The negative active material may be for example, carbon and graphite materials such as natural graphite, artificial graphite, expanded graphite, carbon fiber, non-graphitic carbon, carbon black, carbon nanotube, fullerene, activated carbon, and the like; a metal such as Al, Si, Sn, Ag, Bi, Mg, Zn, In, Ge, Pb, Pd, Pt, Ti, and the like that may be an alloy with lithium and a compound including such an element; a composite material of a metal and a compound thereof and carbon and graphite materials; a lithium-containing nitride, and the like. Among them, carbon-based active materials, silicon-based active materials, fin-based active materials, or silicon-carbon-based active materials may be desirably used and may be used alone or in a combination of two or more.

The separator is not particularly limited and may be any separator of a rechargeable lithium battery. For example, a porous film or non-woven fabric having excellent high rate discharge performance may be used alone or in a mixture thereof. The separator may include pores and the pores may have generally a pore diameter of about 0.01 to about 10 μm and a thickness of about 5 to about 300 μm. A substrate of the separator may include, for example, a polyolefin-based resin, a polyester-based resin, polyvinylidene fluoride (PVDF), a vinylidene fluoride-hexafluoropropylene copolymer, a vinylidene fluoride-perfluorovinylether copolymer, a vinylidene fluoride-tetrafluoroethylene copolymer, a vinylidene fluoride-trifluoroethylene copolymer, a vinylidene fluoride-fluoroethylene copolymer, a vinylidene fluoride-hexafluoroacetone copolymer, a vinylidene fluoride-ethylene copolymer, a vinylidene fluoride-propylene copolymer, a vinylidene fluoride-trifluoropropylene copolymer, a vinylidene fluoride-tetrafluoroethylene-hexafluoropropylene copolymer, a vinylidene fluoride-ethylene-tetrafluoroethylene copolymer, and the like. When the electrolyte is a solid electrolyte such as a polymer, the solid electrolyte may function as a separator.

The conductive material is a component to further improve conductivity of an active material and may be included in an amount of about 1 wt % to about 30 wt % based on a total weight of the electrode, but is not limited thereto. Such a conductive material is not particularly limited as long as it does not cause chemical changes of a battery and has conductivity, and may be for example, graphite such as natural graphite or artificial graphite; carbon black such as carbon black, acetylene black, ketjen black, channel black, furnace black, lamp black, summer black, and the like; a carbon derivative such as carbon nanotube, fullerene, and the like, a conductive fiber such as a carbon fiber or a metal fiber, and the like; carbon fluoride, a metal powder such as aluminum, a nickel powder, and the like; a conductive whisker such as zinc oxide, potassium titanate, and the like; a conductive metal oxide such as a titanium oxide; a conductive material such as a polyphenylene derivative, and the like.

The filler is an auxiliary component to suppress expansion of an electrode, is not particularly limited as long as it does not cause chemical changes of a battery and is a fiber-shaped material, and may be for example, an olefin-based polymer such as polyethylene, polypropylene, and the like; a fiber-shaped material such as a glass fiber, a carbon fiber, and the like.

In the electrode, the current collector may be a site where electron transports in an electrochemical reaction of the active material and may be a negative current collector and a positive current collector according to types of the electrode. The negative current collector may have a thickness of about 3 μm to about 500 μm. The negative current collector is not particularly limited as long as it does not cause chemical changes of a battery and has conductivity and may be, for example, copper, stainless steel, aluminum, nickel, titanium, fired carbon, copper or stainless steel that is surface-treated with carbon, nickel, titanium, silver, or the like, an aluminum-cadmium alloy, and the like.

The positive current collector may have a thickness of about 3 μm to about 500 μm, but is not limited thereto. Such a positive current collector is not particularly limited as long as it does not cause chemical changes of a battery and has high conductivity and may be, for example, stainless steel, aluminum, nickel, titanium, fired carbon, or aluminum or stainless steel that is surface-treated with carbon, nickel, titanium, silver, or the like.

The current collectors may have a fine concavo-convex on its surface to reinforce a binding force of the active material and may be used in various shapes of a film, a sheet, a foil, a net, a porous film, a foam, a non-woven fabric, or the like.

The lithium-containing non-aqueous electrolyte solution may consist of a non-aqueous electrolyte and a lithium salt.

The non-aqueous electrolyte may be, for example, an aprotic organic solvent such as N-methyl-2-pyrrolidinone, propylene carbonate, ethylene carbonate, butylene carbonate, dimethyl carbonate, diethyl carbonate, gamma-butyrolactane 1,2-dimethoxy ethane, tetrahydroxy furan, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, a dioxolane derivative, sulfolane, methyl sulfolane, 1,3-dimethyl-2-imidazolidinone, a propylene carbonate derivative, a tetrahydrofuran derivative, ether, methyl propionate, ethyl propionate, and the like.

The lithium salt is a material that is dissolved in the non-aqueous electrolyte solution and may be, for example, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbFe_6$, $LiAlCl_4$, $CH_3SO_3Li$, $CF_3SO_3Li$, $(CF_3SO_2)_2NLi$, lithium chloro, borane, lower aliphatic lithium carbonate, lithium 4-phenyl borate, imide, and the like.

An organic solid electrolyte, an inorganic solid electrolyte, and the like may be used as needed.

The organic solid electrolyte may be, for example, polyethylene derivative, a polyethylene oxide derivative, a polypropylene oxide derivative, a phosphoric acid ester polymer, a poly agitation lysine, polyester sulfide, polyvinyl alcohol, polyvinylidene fluoride, a polymer including an ionic leaving group, and the like.

The inorganic solid electrolyte may be, for example, nitrides of Li such as $Li_3N$, LiI, $Li5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, $Li_3PO_4$—$Li_2S$—$SiS_2$, and the like, halides, sulfates, and the like.

The non-aqueous electrolyte solution may include, for example, pyridine, triethylphosphite, triethanolamine, cyclic ether, ethylene diamine, n-glyme, hexa phosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride in order to improve charge and discharge characteristics, flame retardancy, and the like. As needed, in order to endow inflammability, a halogen-containing solvent such as carbon tetrachloride, ethylene trifluoride, and the like may be further added and in order to improve high temperature storage characteristics, carbon dioxide gas may be further added.

As described above, a battery including a battery case according to an embodiment does not need manufacture of a unit cell including exterior materials consisting of additional moisture transmission resistance materials on each electrode assembly, and thus an electrode assembly accommodated in the container of the battery case does not need additional exterior materials.

Hereinafter, the embodiments are described with reference to examples and comparative examples. The following examples and comparative examples are exemplary but do not limit the scope of the present disclosure.

EXAMPLES

Synthesis Example: Preparation of Surface-Treated Inorganic Moisture Absorbent

Synthesis Example 1

15 grams (g) of 3-isocyanatopropyl-triethoxysilane as a surface-treating agent is dissolved in 150 mL of a mixed solution of toluene and acetone in a volume % ratio of 66:33, respectively, and 15 g of calcium oxide (CaO) (a particle size average=3 μm) (ANFOGEN #600H, Hwasung Chemical Co., Ltd.) as an inorganic moisture absorbent is added thereto. The mixture is dispersed with the assistance of ultrasound for 15 minutes, and then, stirred and aged (allowed to sit) overnight. The resulting mixture is filtered, washed with acetone, and dried in an 80° C. oven to obtain CaO surface-treated with 3-isocyanatopropyl triethoxysilane.

Synthesis Example 2

Surface-treated CaO is obtained according to the same method as Synthesis Example 1, except that N-(2-aminoethyl)-3-aminopropyltri-methoxysilane is used as a surface-treating agent.

Synthesis Example 3

Surface-treated CaO is obtained according to the same method as Synthesis Example 1, except that (3-glycidyloxypropyl)-trimethoxysilane is used as a surface-treating agent.

Synthesis Example 4

Surface-treated CaO is obtained according to the same method as Synthesis Example 1, except that 50% of [hydroxy(polyethyleneoxy) propyl] triethoxysilane in ethanol is used as a surface-treating agent.

Synthesis Example 5

Surface-treated CaO is obtained according to the same method as Synthesis Example 1, except that oleic acid is used as a surface-treating agent.

Synthesis Example 6

Surface-treated CaO is obtained according to the same method as Synthesis Example 1, except that stearic acid is used as a surface-treating agent.

Synthesis Example 7

Surface-treated CaO is obtained according to the same method as Synthesis Example 1, except that RS610 having a phosphoric acid group at one terminal end (Toho Chemical Industry Aktie) is used as a surface-treating agent.

Synthesis Example 8

Surface-treated CaO is obtained according to the same method as Synthesis Example 1, except that RE610 having a hydroxy group at one terminal end (Toho Chemical Industry Aktie) is used as a surface-treating agent.

Synthesis Example 9

Surface-treated CaO is obtained according to the same method as Synthesis Example 1, except that BYK111 (BYK-Chemie GMBH) having a phosphoric acid group at one terminal end is used as a surface-treating agent.

Examples and Comparative Examples: Manufacture of Composite and Specimen for Measuring Properties

Examples 1 to 9

Each surface-treated inorganic moisture absorbent according to Synthesis Examples 1 to 9 is mixed with a polymer prepared by copolymerizing HBA (hydroxy benzoic acid), HNA (6-hydroxy-2-naphthoic acid), and PET (polyethylene terephthalate) in a mole percent (mol %) ratio of 68:25:7, respectively, (hereafter referred to as a WP2 polymer); a solubility parameter of 22.71 Joules per cubic centimeter ($J/cm^3$) as a base polymer to prepare composite compositions according to Examples 1 to 9.

The composite compositions are respectively inserted into a twin screw hopper and extruded at 280° C., and then, cut with a pelletizer to obtain polymer pellets formed of the composites according to Examples 1 to 9. In addition, the polymer pellets are injection-molded at 300° C. to manufacture disk-shaped specimens (articles) according to Examples 1 to 9 for measuring properties, which have a thickness of about 1 millimeter (mm) and a diameter of 30 mm.

Example 10

A composite and a specimen according to Example 10 is manufactured according to the same method as Example 5 (oleic acid is used as a surface-treating agent), except that a polymer obtained by copolymerizing HBA (hydroxy benzoic acid), IPA (isophthalic acid), HQ (hydroquinone), and BP (4,4'-biphenyl) in a mol % ratio of 40:30:20:10, respectively, (hereinafter a WP3 polymer; a solubility parameter of 22.54 $J/cm^3$) is used instead of the WP2 polymer as a base polymer.

Example 11

A specimen is manufactured according to the same method as Example 10 (BYK111 having a phosphoric acid group at one terminal end), but the inorganic moisture absorbent according to Synthesis Example 9 is used instead of the inorganic moisture absorbent according to Synthesis Example 5 to prepare a composite and a specimen according to Example 11.

Comparative Examples 1 and 2

A composite including the non-surface treated CaO as an inorganic moisture absorbent and the WP2 polymer and a specimen formed therefrom are used as a composite and a specimen according to Comparative Example 1, and in addition, a composite including the non-surface treated CaO as an inorganic moisture absorbent and the WP3 polymer and a specimen formed therefrom are used as a composite and a specimen according to Comparative Example 2.

Comparative Example 3 (Control 1) and Comparative Example 4 (Control 2)

A specimen of Control 1 is prepared by including no inorganic moisture absorbent and only the WP2 polymer as a base polymer, and a specimen of Control 2 is prepared by including no inorganic moisture absorbent and only the WP3 polymer as a base polymer.

Evaluation: Impact Strength and Water Vapor Transmittance Rate of Article

Impact strength and a water vapor transmittance rate (WVTR) of the articles including 10 wt % of an inorganic moisture absorbent based on a total amount (weight) of composite according to Examples 1 to 9 and Comparative Example 1 are measured, and the results are shown in Table 1. In addition, a type of a surface-treating agent used in Examples and Comparative Example 1, and a solubility parameter of the surface-treating agent, and a solubility parameter difference of the surface-treating agent and the WP2 polymer as a base polymer are also shown in the table.

The impact strength is obtained by measuring un-notched type Izod impact strength with Instron (Impactor ☐, CEAST 9050) according to ASTM D265.

The water vapor transmittance rate (WVTR) is measured by using Aquatran2 made by Mocon Inc. according to ISO15106-3 at 38° C. under relative humidity of 100%.

The solubility parameter is calculated according to Relationship Equation 1 by using density or a molar volume at room temperature (25° C.):

$$\delta = (CED)^{0.5} = (\Sigma E_{cohi}/\Sigma Vm_i)^{0.5}$$ Relationship Equation 1

In Relationship Equation 1,

δ denotes a solubility parameter, CED denotes cohesive energy density, $E_{cohi}$ is cohesive energy for a functional group i in molecules, and $Vm_i$ is a molar volume for a functional group i in molecules. Herein, the cohesive energy density (CED) is the cohesive energy per unit volume, which may be expressed as Relationship Equation 2:

$$CED = (\Delta H - RT)/Vm$$ Relationship Equation 2

In Relationship Equation 2,

ΔH denotes the enthalpy change, R denotes a constant, T denotes a temperature, and Vm denotes a molar volume.

$E_{coh}$ is obtained according to Relationship Equation 3 below:

$$E_{coh} = \Delta U = \Delta H - \Delta T$$ Relationship Equation 3

In Relationship Equation 3,

ΔU denotes an internal energy change amount per one mole, ΔH denotes an enthalpy change amount, and ΔT denotes a temperature change amount.

Each surface-treating agent used in Synthesis Examples 1 to 9 is dissolved in ethanol at 25° C. and allowed to stand for 5 hours, and then, a temperature change amount, an enthalpy change amount, an internal energy change amount, and the like of each solution before and after standing for 5 hours are measured or calculated according to Relationship Equations 1 to 3 to obtain a solubility parameter of each surface-treating agent. The solubility parameter of each polymer used as a base polymer may be calculated in the same method as above.

TABLE 1

| | Surface-treating agent | Solubility parameter of surface-treating agent | Solubility parameter difference between WP2 and surface-treating agent | Impact strength (KJ/m$^2$) | WVTR (g/m$^2$/day) |
|---|---|---|---|---|---|
| Example 1 | 3-Isocyanatopropyl-triethoxysilane | 18.50 | 4.21 | 8.63 | — |
| Example 2 | N-(2-aminoethyl)-3-aminopropyltri-methoxysilane | 18.06 | 4.65 | 11.67 | — |
| Example 3 | (3-glycidyloxypropyl)-trimethoxysilane | 19.01 | 3.70 | 10.58 | — |
| Example 4 | [Hydroxy(polyethyleneoxy)propyl] triethoxysilane | 19.09 | 3.62 | 11.51 | — |
| Example 5 | Oleic acid | 18.49 | 4.22 | 11.64 | — |
| Example 6 | Stearic acid | 18.29 | 4.42 | 10.61 | — |
| Example 7 | RS610 | 19.51 | 3.20 | 14.84 | — |
| Example 8 | RE610 | 20.21 | 2.50 | 19.32 | — |
| Example 9 | BYK111 | 20.45 | 2.26 | 22.93 | 0.003 |
| Comparative Example 1 | — | — | — | 8.89 | 0.005 |

As shown in Table 1, the articles according to Examples 7 to 9 including 10 wt % of the inorganic moisture absorbent surface-treated with a surface-treating agent having a solubility parameter difference of less than or equal to about 3.5 from that of a base polymer (3.20, 2.50, and 2.26, respectively) may have greater than or equal to 60% increased impact strength compared with that of the article of Comparative Example 1 including a non-surface treated inorganic moisture absorbent in the same amount. In addition, the article according to Example 9 shows a decreased water vapor transmittance rate (WVTR) compared that of the article of Comparative Example 1, and accordingly, when a surface-treated inorganic moisture absorbent is included according to an embodiment, moisture transmission resistivity may not only be improved due to the inorganic moisture absorbent, but also mechanical properties are greatly increased.

Figure 3:
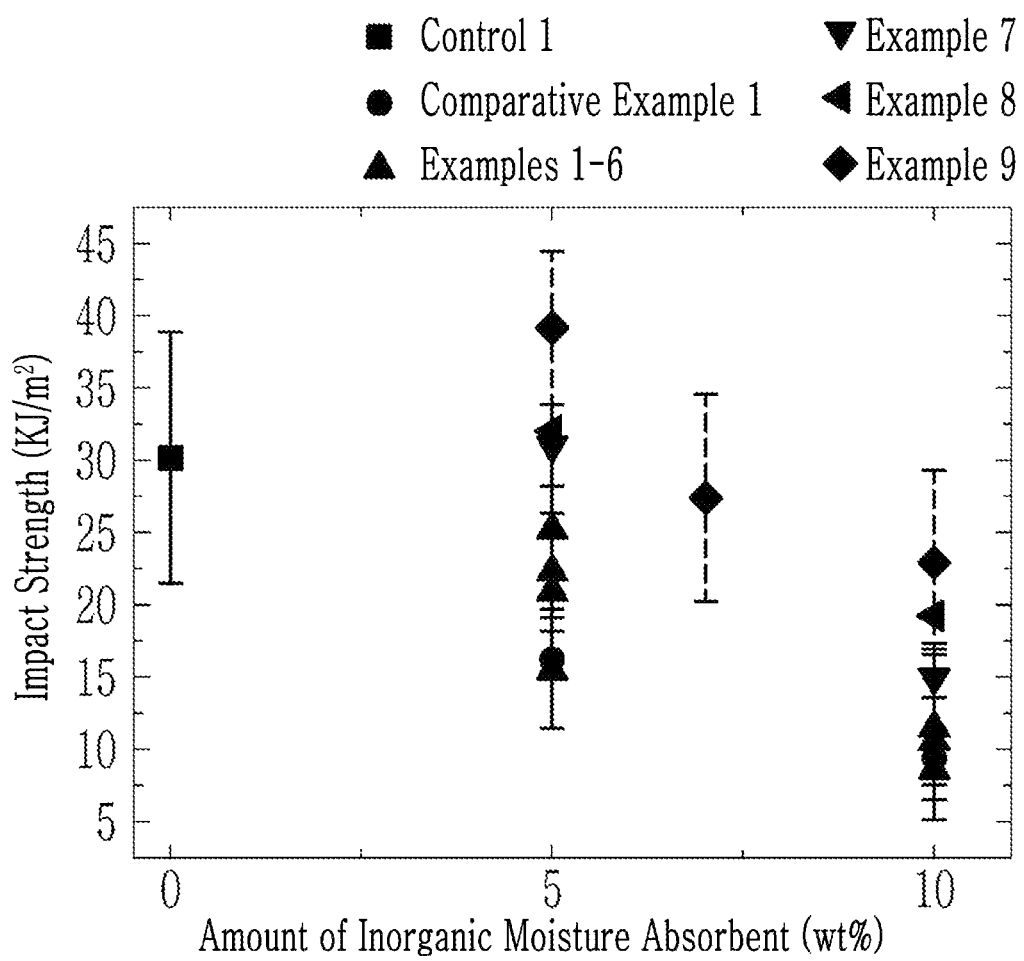
FIG. 3 is a graph showing impact strength of the articles according to Example 1 to Example 9, Comparative Example 1, and Control 1 depending on an amount of the inorganic moisture absorbent.

The impact strength of the articles including no inorganic moisture absorbent and the WP2 polymer alone (Control 1) and respectively including 5 wt %, 7 wt %, and 10 wt % of the inorganic moisture absorbent according to Examples 1 to 9 and Comparative Example 1 is presented as a graph of FIG. 3.

As shown in FIG. 3, when the same amount of the inorganic moisture absorbent is used, as the inorganic moisture absorbent is surface-treated with a surface-treating agent having a smaller solubility parameter difference from a base polymer, impact strength of an article tends to increase. In addition, impact strength of an article including 5 wt % of the inorganic moisture absorbent surface-treated with the same surface-treating agent exhibits a significant increase compared with that of an article including 10 wt % of the inorganic moisture absorbent treated with the same surface-treating agent. For example, as for the article including the inorganic moisture absorbent prepared in Synthesis Example 9 (Example 9), an article including 7 wt % of the inorganic moisture absorbent exhibits much greater impact strength than an article including 10 wt % of the inorganic moisture absorbent, and an article including 5 wt % of the inorganic moisture absorbent exhibits much greater impact strength than the article including 7 wt % of the inorganic moisture absorbent.

Figure 4:
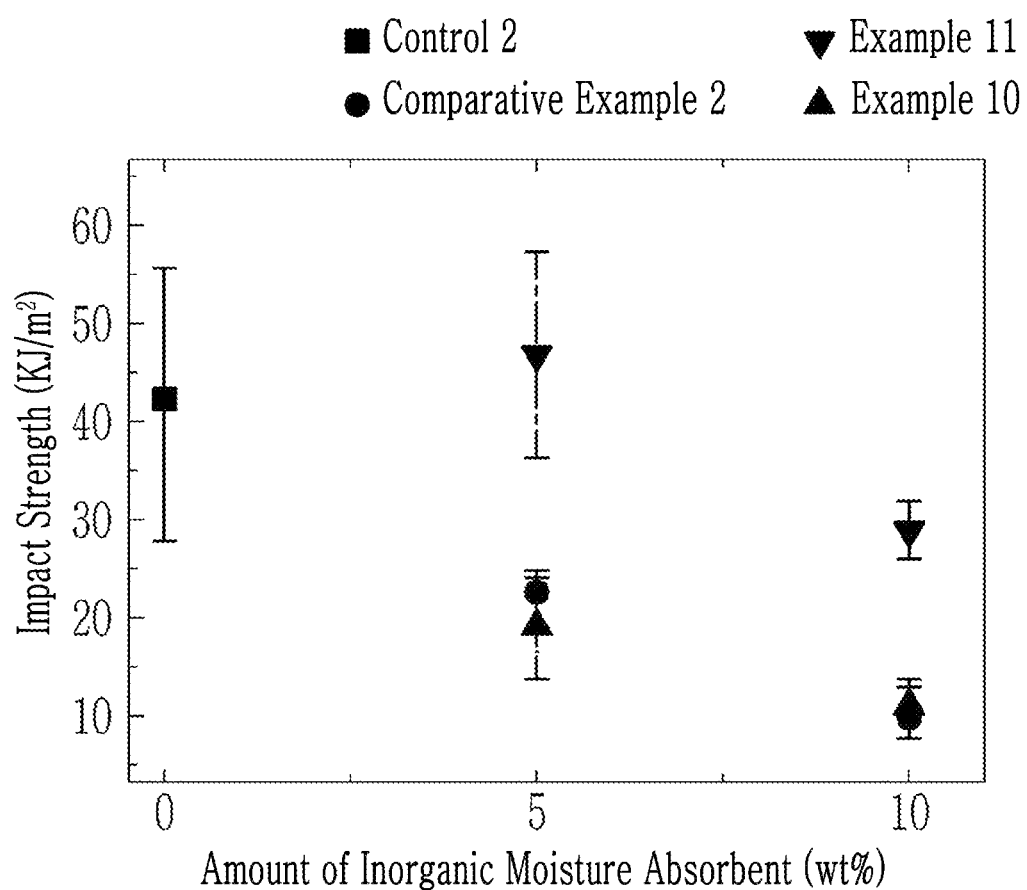
FIG. 4 is a graph showing impact strength of the articles according to Example 10, Example 11, Comparative Example 2, and Control 2 depending on an amount of the inorganic moisture absorbent.

In addition, each impact strength of the articles of Control 2 molded by using the WP3 polymer instead of the WP2 polymer as a base polymer, Comparative Example 2 manufactured by adding the non-surface-treated CaO as an inorganic moisture absorbent to the polymer, and Examples 10 and 11 including CaO respectively surface-treated with oleic acid of Synthesis Example 5 or BYK111 of Synthesis Example 9 as an inorganic moisture absorbent along with the polymer is shown in a graph of FIG. 4.

Referring to FIG. 4, without receiving a large influence from a kind of the polymer, even though the type of the polymer is changed, the article of Example 11 including an inorganic moisture absorbent treated with a surface-treating agent having a smaller solubility parameter difference from that of a base polymer exhibits a larger increase in impact strength compared to the article of Example 10 including an inorganic moisture absorbent treated with a surface-treating agent having a larger solubility parameter difference from that of the base polymer. In addition, when an inorganic moisture absorbent surface-treated with the same surface-treating agent is included, impact strength is clearly increased in the article that includes 5 wt % of the inorganic moisture absorbent compared to a similar article including 10 wt % of the inorganic moisture absorbent.

As illustrated, an article including an inorganic moisture absorbent treated with a surface-treating agent having a solubility parameter difference of less than or equal to 3.5 from that of a base polymer according to an embodiment offers an opportunity to balance a trade-off relationship of mechanical properties such as impact strength and an increase of moisture transmission resistivity due to the presence of an inorganic moisture absorbent. Accordingly, the mechanical properties such as impact strength may be improved, while the moisture transmission resistivity may be increased or maintained.

While this disclosure has been described in connection with what is presently considered to be practical example embodiments, it is to be understood that the invention is not limited to the disclosed embodiments. On the contrary, it is intended to cover various modifications and equivalent arrangements included within the spirit and scope of the appended claims.

What is claimed is:

1. A composite comprising a base polymer and a surface-treated inorganic moisture absorbent, wherein the surface-treated inorganic moisture absorbent is surface-treated with a surface-treating agent having a solubility parameter difference of less than or equal to about 3.5 from that of the base polymer.

2. The composite of claim 1, wherein the surface-treated inorganic moisture absorbent is surface-treated with a surface-treating agent having a solubility parameter difference of less than or equal to about 3.3 from that of the base polymer.

3. The composite of claim 1, wherein the surface-treating agent is a compound, an oligomer, or a polymer that comprises a group capable of being dissolved in water or an alcohol to produce an anion at one terminal end and a hydrophobic group at another terminal end.

4. The composite of claim 3, wherein the group capable of being dissolved in water or alcohol to produce the anion is a hydroxy group, a carboxylic acid group, a phosphoric acid group, or a sulfonic acid group.

5. The composite of claim 3, wherein the hydrophobic functional group is an aliphatic hydrocarbon group, an alicyclic hydrocarbon group, an aromatic hydrocarbon group, a (meth)acryloyl group, a halogen-substituted aliphatic hydrocarbon group, a halogen-substituted alicyclic hydrocarbon group, a halogen-substituted aromatic hydrocarbon group, or a combination thereof.

6. The composite of claim 1, wherein the base polymer comprises polycarbonate, polyolefin, polyvinyl, polyamide, polyester, polyphenylene sulfide, polyphenylene ether, polyphenylene oxide, polystyrene, polyamide, a polycyclic olefin copolymer, an acrylonitrile-butadiene-styrene copolymer, liquid crystal polymer, a mixture thereof, an alloy thereof, or a copolymer thereof.

7. The composite of claim 1, wherein the base polymer comprises a high density polyethylene or a liquid crystal polymer.

8. The composite of claim 1, wherein the base polymer comprises a liquid crystal polymer, wherein the liquid crystal polymer comprises a liquid crystal aromatic polyester comprising a structural unit represented by Chemical Formula 1; a structural unit represented by Chemical Formula 2 and a structural unit represented by Chemical Formula 3; or a structural unit represented by Chemical Formula 1, a structural unit represented by Chemical Formula 2, and a structural unit represented by Chemical Formula 3:

   Chemical Formula 1

   Chemical Formula 2

   Chemical Formula 3 wherein, in Chemical Formulae 1 to 3,

Ar¹, Ar², and Ara³ are each independently a substituted or unsubstituted C6 to C30 single aromatic group, a condensed ring of two or more substituted or unsubstituted C6 to C30 aromatic groups, or a group comprising two or more substituted or unsubstituted C6 to C30 aromatic groups that are linked by a single bond, —O—, —C(=O)—, —C(OH)$_2$—, —S—, or —S(O)$_2$—.

9. The composite of claim 1, wherein the base polymer comprises a liquid crystal polymer, wherein the liquid crystal polymer comprises a structural unit represented by Chemical Formula 4; a structural unit represented by Chemical Formula 5 and a structural unit represented by Chemical Formula 2; or a structural unit represented by Chemical Formula 4, a structural unit represented by Chemical Formula 5, and a structural unit represented by Chemical Formula 2:

   Chemical Formula 4

   Chemical Formula 5

   Chemical Formula 2 wherein, in Chemical Formula 4, Chemical Formula 5, and Chemical Formula 2,

Ar⁴, Ar⁵, and Ar² are each independently a substituted or unsubstituted C6 to C30 single aromatic group, a condensed ring of two or more substituted or unsubstituted C6 to C30 aromatic groups, or a group comprising two or more substituted or unsubstituted C6 to C30 aromatic groups that are linked by a single bond, —O—, —C(=O)—, —C(OH)$_2$—, —S—, or —S(O)$_2$—.

10. The composite of claim 1, wherein the base polymer comprises a liquid crystal polymer and a fluorinated resin.

11. The composite of claim 1, wherein the inorganic moisture absorbent comprises a silica gel, zeolite, CaO, BaO, MgSO$_4$, Mg(ClO$_4$)$_2$, MgO, P$_2$O$_5$, Al$_2$O$_3$, CaH$_2$, NaH, LiAlH$_4$, CaSO$_4$, Na$_2$SO$_4$, CaCO$_3$, K$_2$CO$_3$, CaCl$_2$, Ba(ClO$_4$)$_2$, Ca, or a mixture thereof.

12. The composite of claim 1, wherein the inorganic moisture absorbent comprises CaO, MgO, zeolite, or a mixture thereof.

13. The composite of claim 1, wherein an amount of the surface-treated inorganic moisture absorbent is of less than or equal to about 20 wt %, based on a total weight of the composite.

14. The composite of claim 1, wherein the surface-treating agent is attached to the surface of the inorganic moisture absorbent in an amount of less than about 50 parts by weight per 100 parts by weight of the inorganic moisture absorbent.

15. The composite of claim 1, wherein the composite further comprises a moisture barrier material comprising a crystal of the base polymer or a crystal of a polymer different from the base polymer, a particle of an inorganic material different from the inorganic moisture absorbent, or a fiber-shaped material.

16. An article comprising the composite of claim 1.

17. The article of claim 16, wherein the article has a water vapor transmission rate of less than about 0.005 grams per square meter per day measured at a thickness of 1 millimeter, at 38° C., and relative humidity of 100% according to ISO 15106 or ASTM F1249.

18. A battery case comprising the composite of claim 1.

19. The battery case of claim 18, wherein the battery case comprises a container configured to accommodate an electrode assembly, wherein the container includes a bottom wall and a plurality of side walls, the bottom wall and the side walls are integrated to have an open side opposite the bottom wall and to provide a space for accommodating the electrode assembly, and the container includes the composite.

20. A battery comprising
the battery case of claim 18, and
an electrode assembly comprising a positive electrode and a negative electrode accommodated in the container of the battery case.

* * * * *